US012763353B2

(12) United States Patent
Wu et al.

(10) Patent No.: US 12,763,353 B2
(45) Date of Patent: Oct. 13, 2026

(54) MANUFACTURING DEVICE AND MANUFACTURING METHOD FOR ELECTRODE ASSEMBLY

(71) Applicant: CONTEMPORARY AMPEREX TECHNOLOGY (HONG KONG) LIMITED, Hong Kong (CN)

(72) Inventors: Zhiyang Wu, Ningde (CN); Chao Xie, Ningde (CN); Yiruo Wang, Ningde (CN); Gang Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 91 days.

(21) Appl. No.: 18/618,881

(22) Filed: Mar. 27, 2024

(65) Prior Publication Data

US 2024/0266580 A1 Aug. 8, 2024

Related U.S. Application Data

(63) Continuation of application No. PCT/CN2022/136592, filed on Dec. 5, 2022.

(30) Foreign Application Priority Data

Dec. 21, 2021 (CN) ......................... 202111574653.7

(51) Int. Cl.
*H01M 10/04* (2006.01)
*B32B 37/20* (2006.01)
(Continued)

(52) U.S. Cl.
CPC ......... *H01M 10/0404* (2013.01); *B32B 37/20* (2013.01); *B32B 38/0004* (2013.01);
(Continued)

(58) Field of Classification Search
CPC ......... H01M 10/0404; H01M 10/0587; H01M 50/46; H01M 6/005; H01M 10/0431;
(Continued)

(56) References Cited

U.S. PATENT DOCUMENTS 9,059,472 B2 6/2015 Kim et al.
2014/0117141 A1* 5/2014 Kim .................. H01M 10/0409 242/439.4

FOREIGN PATENT DOCUMENTS

CN 105789675 A * 7/2016 ........ H01M 10/0431
CN 105810990 A 7/2016
(Continued)

OTHER PUBLICATIONS

The World Intellectual Property Organization (WIPO) International Search Report for PCT/CN2022/136592 Feb. 22, 2023 5 Pages (including translation).
(Continued)

*Primary Examiner* — Christopher W Raimund
(74) *Attorney, Agent, or Firm* — ANOVA LAW GROUP, PLLC

(57) ABSTRACT

A manufacturing device for an electrode assembly comprises a first electrode plate feeding mechanism for conveying a first electrode plate, a first separator feeding mechanism for conveying a first separator, a second separator feeding mechanism for conveying a second separator, and a compounding mechanism provided downstream the first electrode plate feeding mechanism, the first separator feeding mechanism, and the second separator feeding mechanism. The compounding mechanism is used for sequentially laminating and compounding the first separator, the first electrode plate, and the second separator into a first electrode plate complex. The manufacturing device further comprises a second electrode plate feeding mechanism for conveying a second electrode plate having opposite polarity than the
(Continued)

first electrode plate, and a winding mechanism provided downstream the compounding mechanism and the second electrode plate feeding mechanism and used for winding the first electrode plate complex and the second electrode plate to form an electrode assembly.

11 Claims, 4 Drawing Sheets

(51) Int. Cl.

| | |
|---|---|
| ***B32B 38/00*** | (2006.01) |
| ***B32B 38/18*** | (2006.01) |
| ***H01M 10/0587*** | (2010.01) |
| ***H01M 50/46*** | (2021.01) |

(52) U.S. Cl.
CPC ...... *B32B 38/1833* (2013.01); *B32B 38/1875* (2013.01); *H01M 10/0587* (2013.01); *H01M 50/46* (2021.01); *B32B 2309/72* (2013.01); *B32B 2457/10* (2013.01)

(58) Field of Classification Search
CPC ............... H01M 10/0409; B32B 37/20; B32B 38/0004; B32B 38/1833; B32B 38/1875; B32B 2309/72; B32B 2457/10; Y02E 60/10; Y02P 70/50
See application file for complete search history.

(56) References Cited

FOREIGN PATENT DOCUMENTS

| | | | | | |
|---|---|---|---|---|---|
| CN | 105895860 | A | | 8/2016 | |
| CN | 207346860 | U | * | 5/2018 | |
| CN | 105074989 | B | | 11/2018 | |
| CN | 110718718 | A | * | 1/2020 | ........ H01M 10/0587 |
| CN | 112310461 | A | | 2/2021 | |
| CN | 214848748 | U | * | 11/2021 | |
| CN | 214957023 | U | | 11/2021 | |
| CN | 221352823 | U | | 7/2024 | |
| JP | 2015135734 | A | * | 7/2015 | |
| JP | 2019192340 | A | * | 10/2019 | |
| KR | 10-2016-0097915 | | * | 8/2016 | |
| KR | 20160097915 | A | | 8/2016 | |
| WO | 2021008555 | A1 | | 1/2021 | |

OTHER PUBLICATIONS

State Intellectual Property Office of China The First Office Action for Application No. 202111574653.7 Jan. 27, 2025 13 pages (including translation).

The European Patent Office (EPO) The Extended European Search Report for Application No. 22909720.9 Mar. 24, 2025 9 Pages.

* cited by examiner

MANUFACTURING DEVICE AND MANUFACTURING METHOD FOR ELECTRODE ASSEMBLY

CROSS-REFERENCE TO RELATED APPLICATIONS

The present application is a continuation of International Application No. PCT/CN2022/136592, filed on Dec. 5, 2022, which claims priority to Chinese patent application 202111574653.7 filed on Dec. 21, 2021 and entitled "MANUFACTURING DEVICE AND MANUFACTURING METHOD FOR ELECTRODE ASSEMBLY," the entire contents of both of which are incorporated herein by reference.

TECHNICAL FIELD

The present application relates to the technical field of battery production, and in particular to a manufacturing device and a manufacturing method for an electrode assembly.

BACKGROUND

Battery cells have the advantages of high specific energy, high power density, etc., and as the main energy source in the field of new energy, it plays a very important and decisive significance for the development of the new energy field. The electrode assembly, as a constituent unit of the battery cell, has an important impact on the performance of the battery cell.

In the production process of electrode assemblies, how to improve the production efficiency and yield of electrode assemblies is an urgent problem to be solved.

SUMMARY

The present application provides a manufacturing device and a manufacturing method for an electrode assembly, which are intended to improve the production efficiency and yield of electrode assemblies.

In a first aspect, the present application proposes a manufacturing device for an electrode assembly, comprising: a first electrode plate feeding mechanism for conveying a first electrode plate; a first separator feeding mechanism for conveying a first separator; a second separator feeding mechanism for conveying a second separator; a compounding mechanism provided downstream of the first electrode plate feeding mechanism, the first separator feeding mechanism, and the second separator feeding mechanism, the compounding mechanism being used for sequentially laminating and compounding the first separator, the first electrode plate, and the second separator into a first electrode plate complex; a second electrode plate feeding mechanism for conveying a second electrode plate, the second electrode plate and the first electrode plate having opposite polarities; and a winding mechanism provided downstream of the compounding mechanism and the second electrode plate feeding mechanism and used for winding the first electrode plate complex and the second electrode plate to form an electrode assembly.

In embodiments of the present application, the first electrode plate complex is formed by laminating the first electrode plate, the first separator, and the second separator into an integral body in advance, wherein the first electrode plate is covered by the first separator and the second separator on the two sides in the thickness direction thereof, so that the first electrode plate is not prone to warping, folding, or wrinkling, etc., in the conveying process, and the first electrode plate is not easily peeled off from the first separator and the second separator, thereby eliminating the need to additionally arrange an adhesive applying device to fix the first electrode plate, and the first electrode plate complex and the second electrode plate enter into the winding mechanism and are wound, which makes it possible to reduce the likelihood of the first electrode plate and the second electrode plate being folded or wrinkled, and thus to increase the yield of the electrode assembly. Since the first electrode plate, the first separator and the second separator are pre-aligned and compounded as an integral body, conveying the first electrode plate complex and the second electrode plate to the winding mechanism for winding effectively reduces the total number of plates entering the winding mechanism, which is conducive to reducing the difficulty of aligning the first electrode plate, the first separator, the second separator and the second electrode plate and is particularly conducive to increasing the precision of alignment of the first electrode plate and the second electrode plate, thereby further improving the yield of the electrode assembly. The first electrode plate enters the winding mechanism under the driving of the first separator and the second separator, so that it is possible to not arrange a winding entering auxiliary mechanism for guiding winding entering of the first electrode plate, thereby simplifying the structure of the device, while at the same time making it possible to save the cutting-off and feeding time of the first electrode plate, which in turn can reduce the production cycle of the electrode assembly, thereby facilitating the improvement of the production efficiency of the winding.

In some embodiments, the winding mechanism comprises a winding mandrel and a first electrode plate winding entering roller set, the first electrode plate winding entering roller set being provided upstream of the winding mandrel, and the first electrode plate winding entering roller set being used for conveying the first electrode plate complex to the winding mandrel. In embodiments of the present application, it is only needed to make the first electrode plate complex enter the winding mandrel under the driving of the first electrode plate winding entering roller set, and there is no need to arrange an auxiliary winding entering mechanism, which is conducive to reducing the complexity of the manufacturing device and improving the production efficiency of electrode assemblies.

In some embodiments, the manufacturing device further comprises a feeding guide mechanism, the feeding guide mechanism being provided between the second electrode plate feeding mechanism and the winding mechanism, and the feeding guide mechanism being used for conveying the second electrode plate to the winding mandrel so that the first electrode plate complex is coated outside the second electrode plate. In embodiments of the present application, the feeding guide mechanism is capable of assisting the winding entering of the second electrode plate, thereby improving the precision of alignment of the first electrode plate complex and the second electrode plate, in particular the degree of alignment along the length direction of the first electrode plate complex.

In some embodiments, the winding mechanism further comprises a rotating base and at least two winding mandrels, the at least two winding mandrels being disposed around an axis of rotation of the rotating base and provided at intervals on the rotating base. In embodiments of the present application, a plurality of winding mandrels are provided, which facilitates the continuous production of electrode assemblies.

In some embodiments, the manufacturing device further comprises a first cut-off mechanism, the first cut-off mechanism being disposed between the at least two winding mandrels and used for cutting off the first electrode plate complex; and/or the manufacturing device further comprises a second cut-off mechanism, the second cut-off mechanism being disposed between the second electrode plate feeding mechanism and the winding mechanism and used for cutting off the second electrode plate. In embodiments of the present application, the first cut-off mechanism is disposed below the winding station, so that the debris produced by the first cut-off mechanism substantially does not fall to the winding station, which reduces the adverse effect of dust on the interior of the electrode assembly, and thus can ensure the safety performance of the electrode assembly. The second cut-off mechanism is provided upstream of the winding mechanism, which is conducive to the smooth operation of the cut-off operation, and the second cut-off mechanism is far from the winding mechanism, thereby making it possible to effectively reduce the possibility of dust produced during the cut-off process entering the winding, thus improving the safety performance of the electrode assembly.

In some embodiments, the manufacturing device further comprises a first detection mechanism, the first detection mechanism being disposed between the compounding mechanism and the winding mechanism, and the first detection mechanism being used for detecting the degree of alignment for compounding of the first electrode plate, the first separator and the second separator. The first detection mechanism is capable of detecting in real time the degree of alignment of the first electrode plate, the first separator and the second separator after lamination. In embodiments of the present application, only when the degree of alignment of the first electrode plate, the first separator, and the second separator meets the accuracy requirements can the first electrode plate complex be conveyed to the winding mechanism for winding, which is conducive to ensuring the yield and quality of the wound electrode assembly In some embodiments, the manufacturing device further comprises a first deviation rectification mechanism and a second deviation rectification mechanism, the first deviation rectification mechanism being disposed between the compounding mechanism and the winding mechanism, and the first deviation rectification mechanism being used for adjusting relative positions of the first electrode plate complex and the second electrode plate; and the second deviation rectification mechanism being disposed between the second electrode plate feeding mechanism and the winding mechanism, and the second deviation rectification mechanism being used for adjusting relative positions of the first electrode plate complex and the second electrode plate. In embodiments of the present application, the first deviation rectification mechanism and the second deviation rectification mechanism are capable of adjusting the relative positions between the first electrode plate complex and the second electrode plate, so that the first electrode plate complex and the second electrode plate are aligned with each other, and the degree of alignment between the two meets the product requirements, which is conducive to improving the yield of the electrode assembly.

In some embodiments, the manufacturing device further comprises a third deviation rectification mechanism, a fourth deviation rectification mechanism and a fifth deviation rectification mechanism; the third deviation rectification mechanism being disposed between the first electrode plate feeding mechanism and the compounding mechanism, and the third deviation rectification mechanism being used for adjusting relative positions between the first electrode plate, the first separator, and the second separator; the fourth deviation rectification mechanism being disposed between the first separator feeding mechanism and the compounding mechanism, and the fourth deviation rectification mechanism being used for adjusting relative positions between the first electrode plate, the first separator, and the second separator; and the fifth deviation rectification mechanism being disposed between the second separator feeding mechanism and the compounding mechanism, and the fifth deviation rectification mechanism being used for adjusting relative positions between the first electrode plate and the first separator and the second separator. In embodiments of the present application, the third deviation rectification mechanism, the fourth deviation rectification mechanism, and the fifth deviation rectification mechanism are capable of adjusting the relative positions between the first electrode plate, the first separator, and the second separator so that the three are aligned with each other.

In some embodiments, the manufacturing device further comprises a first tensioning mechanism, a second tensioning mechanism and a third tensioning mechanism; the first tensioning mechanism being provided between the compounding mechanism and the winding mechanism, and the first tensioning mechanism being used for adjusting a degree of tensioning of the first electrode plate complex; the second tensioning mechanism being provided between the second electrode plate feeding mechanism and the winding mechanism, and the second tensioning mechanism being used for adjusting a degree of tensioning of the second electrode plate; and the third tensioning mechanism being provided between the first electrode plate feeding mechanism and the compounding mechanism, and the third tensioning mechanism being used for adjusting a degree of tensioning of the first electrode plate.

In the above technical solution, the first tensioning mechanism is used for adjusting the degree of tensioning of the first electrode plate complex to reduce the risk of wrinkling of the first electrode plate complex. The second tensioning mechanism is provided between the second electrode plate feeding mechanism and the winding mechanism, and the second tensioning mechanism is used for adjusting a degree of tensioning of the second electrode plate to reduce the risk of wrinkling of the second electrode plate. The third tensioning mechanism is used for adjusting the degree of tensioning of the first electrode plate to reduce the risk of wrinkling of the first electrode plate and improve the yield of the electrode assembly.

In some embodiments, the quantity of the first electrode plate feeding mechanisms is two, and the manufacturing device further comprises a first roll changing mechanism provided between the first electrode plate feeding mechanism and the compounding mechanism, two first electrode plate feeding mechanisms being provided on two sides of the first roll changing mechanism, respectively; and/or the quantity of the second electrode plate feeding mechanisms is two, and the manufacturing device further comprises a second roll changing mechanism provided between the second electrode plate feeding mechanism and the winding mechanism, two second electrode plate feeding mechanisms being provided on two sides of the second roll changing mechanism, respectively. In embodiments of the present application, it is beneficial to improve the production efficiency through timely roll changing for the first roll changing mechanism and the second roll changing mechanism.

In the second aspect, embodiments of the present application also provide a manufacturing method for an electrode assembly, comprising: providing a first separator, a first electrode plate and a second separator; sequentially laminating and compounding the first separator, the first electrode plate and the second separator into a first electrode plate complex; providing a second electrode plate; and winding the first electrode plate complex and the second electrode plate together to form an electrode assembly, wherein the first electrode plate and the second electrode plate are separated by the first separator and the second separator.

In some embodiments, it further comprises: cutting off the second electrode plate and cutting off the first electrode plate complex after conveying the second electrode plate and the first electrode plate complex to a winding station and winding them.

DESCRIPTION OF DRAWINGS

In order to more clearly illustrate the technical solutions of embodiments of the present application, the following is a brief description of the accompanying drawings to be used in embodiments of the present application. It is obvious that the accompanying drawings described below are only some embodiments of the present application, and other accompanying drawings can be obtained according to the accompanying drawings without any creative work for a person of ordinary skill in the art.

Figure 1:
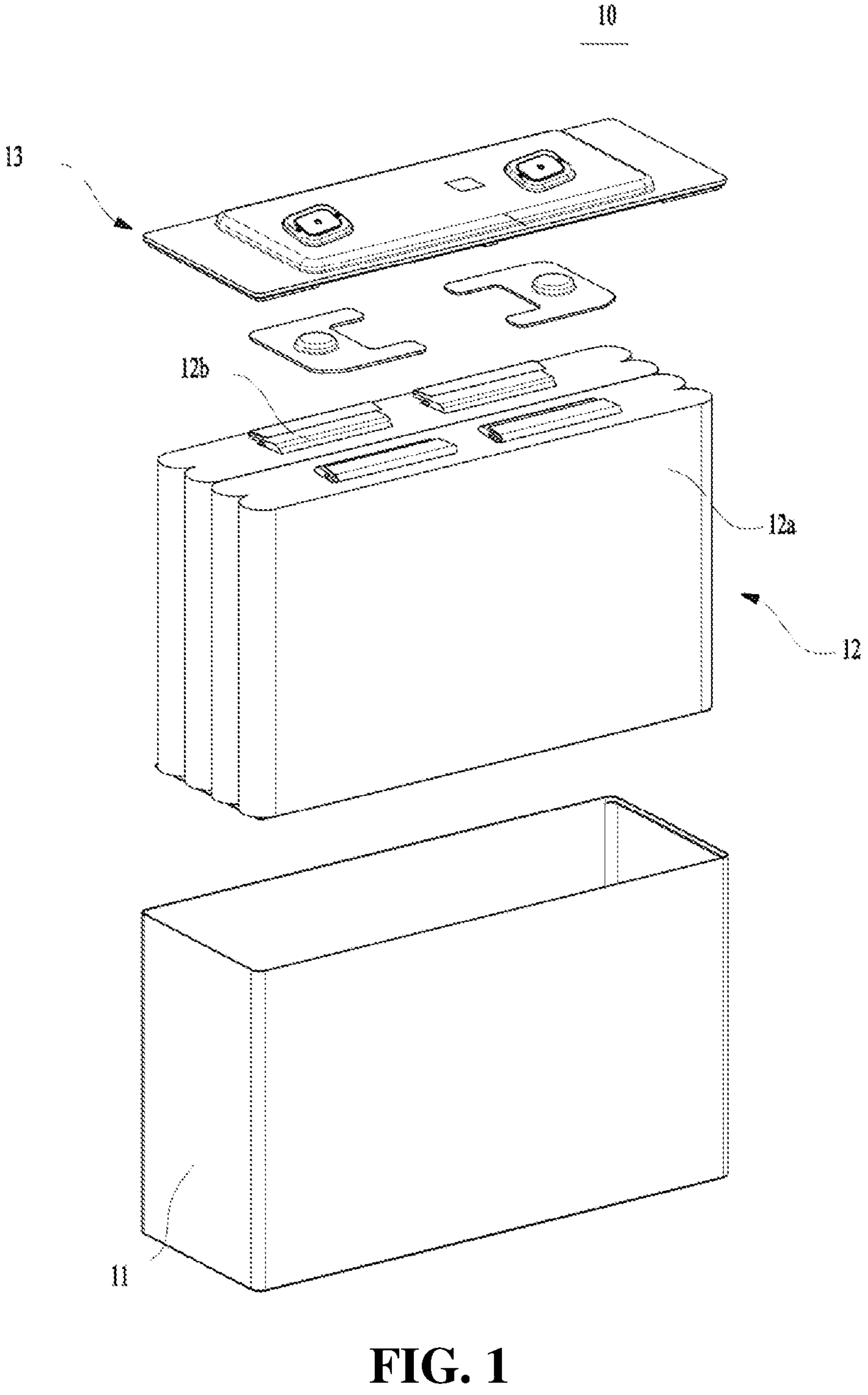
FIG. 1 is an exploded schematic diagram of a battery cell provided in some embodiments of the present application.

In the accompanying drawings, the accompanying drawings are not necessarily drawn to actual scale.

Here, the reference numerals in the drawings are as follows:

- 10. Battery cell; 11. Case; 12. Electrode assembly; 12*a*. Main body portion; 12*b*. Tab portion; 121. First electrode plate; 122. Second electrode plate; 123. First separator; 124. Second separator; 125. first electrode plate complex; 13. End cover assembly;
- 100. Manufacturing device;
- 101. First electrode plate feeding mechanism;
- 102. First separator feeding mechanism;
- 103. Second separator feeding mechanism;
- 104. compounding mechanism;
- 105. Second electrode plate feeding mechanism;
- 106. Winding mechanism; 1061. winding mandrel; 1062. Rotating base;
- 107. First electrode plate winding entering roller set;
- 108. Feeding guide mechanism;
- 109. First cut-off mechanism;
- 110. Second cut-off mechanism;
- 111. First detection mechanism;
- 112. First deviation rectification mechanism;
- 113. Second deviation rectification mechanism;
- 114. Third deviation rectification mechanism;
- 115. Fourth deviation rectification mechanism;
- 116. Fifth deviation rectification mechanism;
- 117. First tensioning mechanism;
- 118. Second tensioning mechanism;
- 119. Third tensioning mechanism;
- 120. First roll changing mechanism;
- 130. Second roll changing mechanism;
- 140. Separator flattening mechanism;
- 150. Back gum adhesive mechanism;
- 160. Pre-pressing mechanism;
- 170. Transport assembly.

DETAILED DESCRIPTION

Embodiments of the present application will be described in further detail hereinafter in conjunction with the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the mechanism or element referred to must have a particular orientation or be constructed and operated in a particular orientation, and therefore will not be interpreted as limiting the present application. In addition, the terms "first" and "second" are used for descriptive purposes only, and cannot be construed as indicating or implying relative importance. "Vertical" does not mean being vertical in the strict sense, but within the permissible range of error. "Parallel" does not mean being parallel in the strict sense, but within the permissible range of error.

In the description of the present application, it should also be noted that, unless otherwise expressly specified and defined, the terms "install", "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

In this disclosure, the phrases "at least one of A, B, and C" and "at least one of A, B, or C" both mean only A, only B, only C, or any combination of A, B, and C.

In the present application, the battery cell may comprise a lithium-ion secondary battery cell, a lithium-ion primary battery cell, a lithium-sulfur battery cell, a lithium-sodium-ion battery cell, a sodium-ion battery cell, a magnesium-ion battery cell, or the like, which is not limited in embodiments of the present application. The battery cell may be cylindrical, flat, rectangular, or in other shapes, which is also not limited in embodiments of the present application. The battery cells are generally divided into three types according to encapsulating manners: cylindrical battery cells, prismatic rectangular battery cells, and pouch cells, which are not limited in embodiments of the present application.

The battery cell comprises an electrode assembly, and the electrode assembly is a core member for charging and discharging the battery cell. The battery cell comprises an electrode assembly and an electrolyte, and the electrode assembly comprises a positive electrode plate, a negative electrode plate, and a spacer. The battery cell operates mainly relying on movement of metal ions between the positive electrode plate and the negative electrode plate. The positive electrode plate comprises a positive electrode current collector and a positive electrode active material layer, wherein the positive electrode active material layer is coated on the surface of the positive electrode current collector; and the positive electrode current collector comprises a positive electrode current collecting portion and a positive tab protruding out of the positive electrode current collecting portion, the positive electrode current collecting portion being coated with the positive electrode active material layer, and at least a portion of the positive tab not being coated with the positive electrode active material layer. Taking a lithium-ion battery cell as an example, the material of the positive electrode current collector may be aluminum, the positive electrode active material layer comprises a positive electrode active material, and the positive electrode active material may be lithium cobalt oxide, lithium iron phosphate, ternary lithium, or lithium manganate, and the like. The negative electrode plate comprises a negative electrode current collector and a negative electrode active material layer, wherein the negative electrode active material layer is coated on the surface of the negative electrode current collector; and the negative electrode current collector comprises a negative electrode current collecting portion and a negative tab protruding out of the negative electrode current collecting portion, the negative electrode current collecting portion being coated with the negative electrode active material layer, and at least a portion of the negative tab not being coated with the negative electrode active material layer. The material of the negative electrode current collector may be copper, and the negative electrode active material layer comprises a negative electrode active material, and the negative electrode active material may be carbon or silicon or the like. In order to ensure that no fusing occurs when a large current passes, there are a plurality of positive tabs which are laminated together, and there are a plurality of negative tabs which are laminated together. The spacer can be made of PP (polypropylene) or PE (polyethylene), among others.

The inventor found that in preparing an electrode assembly, a positive electrode plate, a spacer, and a negative electrode plate are separately input into a winding mechanism for winding, and the positive electrode plate, the spacer, and the negative electrode plate are sequentially laminated and wound for more than two revolutions to form an electrode assembly. During the preparation process, the positive electrode plate, the spacer and the negative electrode plate need to be separately assisted in winding entering, and its productivity is low. The number of plates entering winding is high, and it is difficult to control the degree of alignment. Misalignment between the positive electrode plate and the negative electrode plate is easy to occur, resulting in a low yield of the electrode assembly.

In view of this, the inventors have improved the device for manufacturing electrode assemblies, as further described below in embodiments of the present application.

For a better understanding of the present application, embodiments of the present application are described below in conjunction with FIGS. 1 to 5.

Figure 2:
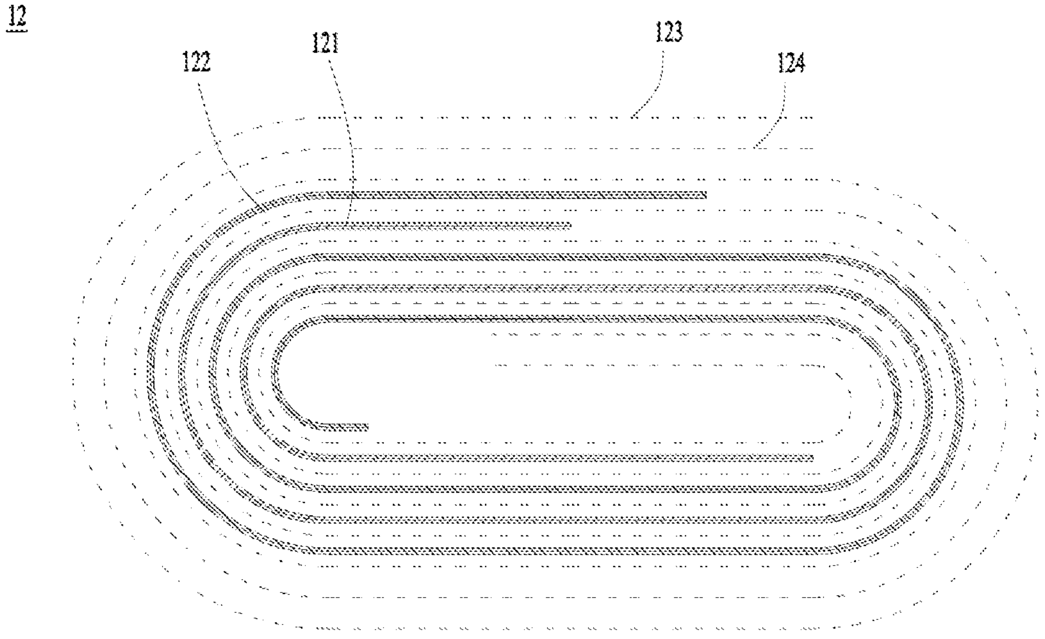
FIG. 2 is a structural schematic diagram of an electrode assembly provided in some embodiments of the present application.

FIG. 1 is an exploded schematic diagram of a battery cell provided in some embodiments of the present application. FIG. 2 is a structural schematic diagram of an electrode assembly provided in some embodiments of the present application.

As shown in FIGS. 1 and 2, the battery cell 10 of embodiments of the present application comprises a case 11, an electrode assembly 12 disposed within the case 11, and an end cover assembly 13 hermetically connected to the case 11. The case 11 is of a square structure, a cylindrical structure, or other shapes, and the shape of the case 11 is determined according to the shape of the electrode assembly 12. The case 11 has an interior space that accommodates the electrode assembly 12 and the electrolyte solution and an opening that communicates with the interior space. The case 11 may be made of, for example, aluminum, aluminum alloy, or plastic.

The electrode assembly 12 comprises a first electrode plate 121, a second electrode plate 122, a first separator 123, and a second separator 124. The first electrode plate 121 and the second electrode plate 122 are of opposite polarities. For example, the first electrode plate 121 is a positive electrode plate and correspondingly, the second electrode plate 122 is a negative electrode plate; or the first electrode plate 121 is a negative electrode plate and correspondingly, the second electrode plate 122 is a positive electrode plate. Optionally, the first electrode plate 121 may be a negative electrode plate, and the size specifications (e.g., length, width) of the negative electrode plate are larger than the size specifications of the positive electrode plate. The first separator 123 and the second separator 124 form a spacer, and the first separator 123 and the second separator 124 are insulators interposed between the first electrode plate 121 and the second electrode plate 122.

The first electrode plate 121, the first separator 123, and the second separator 124 are compounded into a first electrode plate complex 125 in advance, and then when the first electrode plate complex 125 is compounded with the second electrode plate 122, it is possible to reduce the difficulty of controlling the alignment and to improve the degree of alignment of the lamination.

In embodiments of the present application, in terms of the shape of the electrode assembly 12, the electrode assembly 12 comprises a main body portion 12*a* and a tab portion 12*b* connected to the main body portion 12*a*. The main body portion 12*a* as a whole is of a flat-like structure having a predetermined thickness, height and width. The electrode assembly 12 may be first wound into a hollow cylindrical structure and then flattened to a flat shape after winding. Of course, the electrode assembly 12 can also be wound directly into a flat-like structure.

The battery cell 10 described in embodiments of the present application is used in an electrical apparatus using a battery cell. The electrical apparatus may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an extended-range electric vehicle, or the like. The spacecraft comprises airplanes, rockets, space shuttles, spaceships, and the like. The electric toy comprises fixed or mobile electric toys, such as game consoles, electric car toys, electric ship toys and electric aircraft toys. The electric tool comprises metal cutting electric tools, grinding electric tools, assembly electric tools and railway electric tools, such as electric drills, electric grinders, electric wrenches, electric screwdrivers, electric hammers, impact drills, concrete vibrators and electric planers. No special limitation is imposed on the electrical apparatus in embodiments of the present application.

Figure 3:
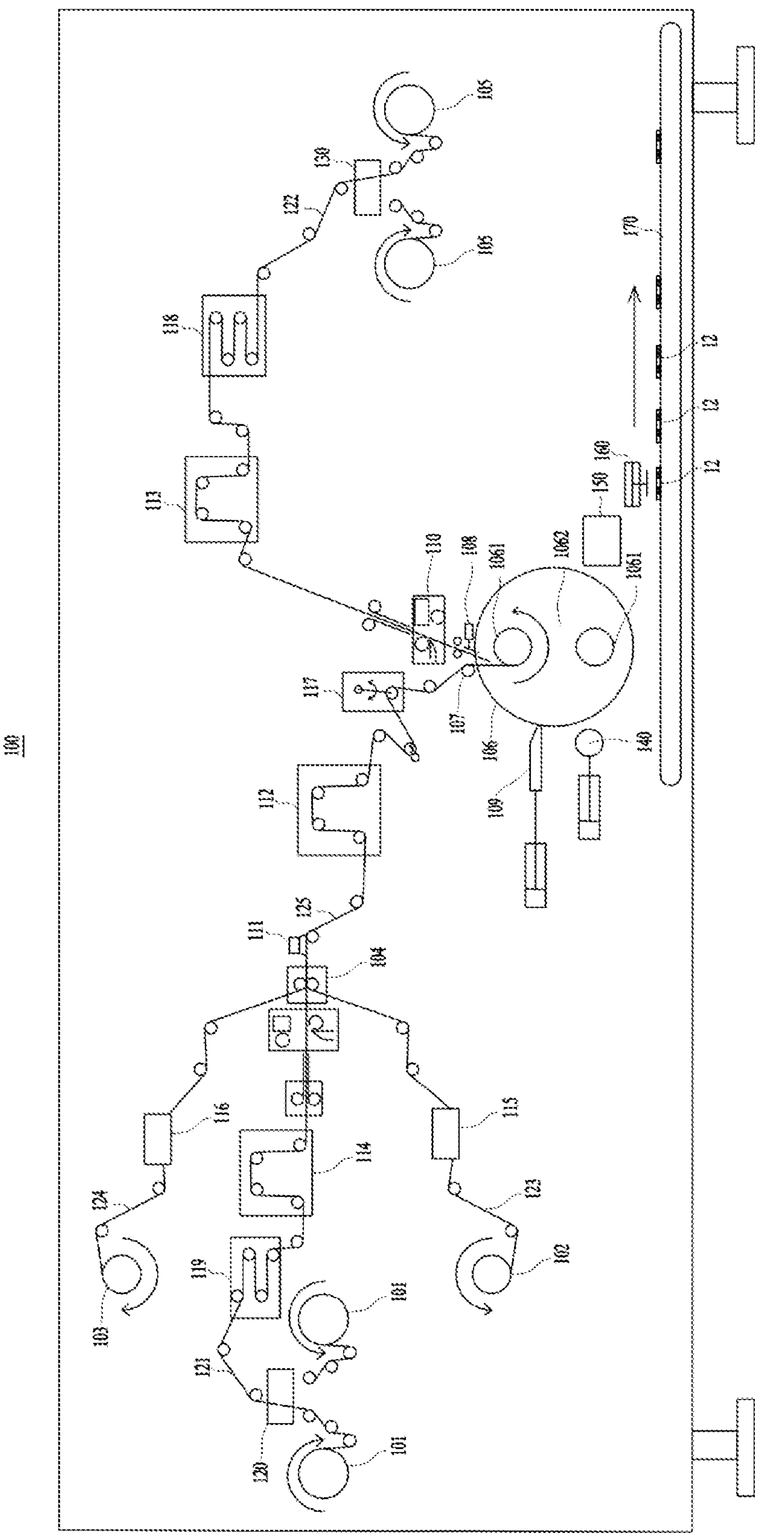
FIG. 3 is a structural schematic diagram of a manufacturing device for an electrode assembly provided in some embodiments of the present application.

FIG. 3 is a structural schematic diagram of a manufacturing device for an electrode assembly provided in some embodiments of the present application.

As shown in FIG. 3, an embodiment of the present application provides a manufacturing device for an electrode assembly. The manufacturing device 100 comprises a first electrode plate feeding mechanism 101, a first separator feeding mechanism 102, a second separator feeding mechanism 103, a compounding mechanism 104, a second electrode plate feeding mechanism 105, and a winding mechanism 106. The first electrode plate feeding mechanism 101 is used for conveying the first electrode plate 121. The first separator feeding mechanism 102 is used for conveying a first separator 123. The second separator feeding mechanism 103 is used for conveying a second separator 124. The compounding mechanism 104 is provided downstream of the first electrode plate feeding mechanism 101, the first separator feeding mechanism 102, and the second separator feeding mechanism 103, and the compounding mechanism 104 is used for sequentially laminating and compounding the first separator 123, the first electrode plate 121, and the second separator 124 into a first electrode plate complex 125. The second electrode plate feeding mechanism 105 is used for conveying a second electrode plate 122, the second electrode plate 122 and the first electrode plate 121 having opposite polarities. The winding mechanism 106 is provided downstream of the compounding mechanism 104 and the second electrode plate feeding mechanism 105 and used for winding the first electrode plate complex 125 and the second electrode plate 122 to form an electrode assembly 12.

The first electrode plate feeding mechanism 101 is used for mounting and fixing a material roll of the first electrode plate 121, wherein the first electrode plate 121 can be conveyed by the unwinding mechanism. The first electrode plate 121 is moved towards the compounding mechanism 104 under the driving of the conveying roller set.

The first separator feeding mechanism 102 is used for mounting and fixing a material roll of the first separator 123, wherein the first separator 123 can be conveyed by the unwinding mechanism. The first separator 123 is moved towards the compounding mechanism 104 under the driving of the conveying roller set.

The second separator feeding mechanism 103 is used for mounting and fixing a material roll of the second separator 124, wherein the second separator 124 can be conveyed by the unwinding mechanism. The second separator 124 is moved towards the compounding mechanism 104 under the driving of the conveying roller set.

The first electrode plate 121, the first separator 123, and the second separator 124 are all conveyed to the compounding mechanism 104, and the first separator 123, the first electrode plate 121, and the second separator 124 are sequentially laminated in a thickness direction of the first electrode plate 121, and the compounding mechanism 104 laminates the first separator 123, the first electrode plate 121, and the second separator 124 into the first electrode plate complex 125. Methods of lamination comprise hot pressing, electrostatic adsorption, bonding or plasma adsorption.

As some examples, the compounding mechanism 104 comprises a hot pressing mechanism, and the first separator 123, the first electrode plate 121, and the second separator 124 are hot pressed for lamination by the hot pressing mechanism. As another example, the compounding mechanism 104 comprises an electrostatic generator, and the first separator 123, the first electrode plate 121, and the second separator 124 are compounded and connected by electrostatic adsorption. As some further examples, the compounding mechanism 104 comprises a gluing mechanism, and the first separator 123, the first electrode plate 121, and the second separator 124 are compounded and connected by means of bonding. As some further examples, the compounding mechanism 104 comprises a plasma adsorption apparatus, and the first separator 123, the first electrode plate 121, and the second separator 124 are compounded and connected by means of plasma adsorption.

The second electrode plate feeding mechanism 105 is used for mounting and fixing a material roll of the second electrode plate 122, wherein the second electrode plate 122 can be conveyed by the unwinding mechanism. The second electrode plate 122 is moved towards the winding mechanism 106 under the driving of the conveying roller set.

The winding mechanism 106 is provided downstream of the compounding mechanism 104 and the second electrode plate feeding mechanism 105, and the first electrode plate complex 125 and the second electrode plate 122 are separately conveyed to the winding mechanism 106 to be wound and compounded into the electrode assembly 12.

In embodiments of the present application, the first electrode plate complex 125 is formed by laminating the first electrode plate 121, the first separator 123, and the second separator 124 into an integral body in advance, wherein the first electrode plate 121 is covered by the first separator 123 and the second separator 124 on the two sides in the thickness direction thereof, so that the first electrode plate 121 is not prone to warping, folding, or wrinkling, etc., in the conveying process, and the first electrode plate 121 is not easily peeled off from the first separator 123 and the second separator 124, thereby eliminating the need to additionally arrange an adhesive applying device to fix the first electrode plate 121, and the first electrode plate complex 125 and the second electrode plate 122 enter into the winding mechanism 106 and are wound, which makes it possible to reduce the likelihood of the first electrode plate 121 and the second electrode plate 122 being folded or wrinkled, and thus to increase the yield of the electrode assembly 12.

Since the first electrode plate 121, the first separator 123 and the second separator 124 are pre-aligned and compounded as an integral body, conveying the first electrode plate complex 125 and the second electrode plate 122 to the winding mechanism 106 for winding effectively reduces the total number of plates entering the winding mechanism 106, which is conducive to reducing the difficulty of aligning the first electrode plate 121, the first separator 123, the second separator 124 and the second electrode plate 122 and is particularly conducive to increasing the precision of alignment of the first electrode plate 121 and the second electrode plate 122, thereby further improving the yield of the electrode assembly 12. The first electrode plate 121 enters the winding mechanism 106 under the driving of the first separator 123 and the second separator 124, so that it is possible to not arrange a winding entering auxiliary mechanism for guiding winding entering of the first electrode plate 121, thereby simplifying the structure of the device, while at the same time making it possible to save the cutting-off and feeding time of the first electrode plate 121, which in turn can reduce the production cycle of the electrode assembly 12, thereby facilitating the improvement of the production efficiency of the winding.

In some embodiments, the winding mechanism 106 comprises a winding mandrel 1061 and a first electrode plate winding entering roller set 107, the first electrode plate winding entering roller set 107 being provided upstream of the winding mandrel 1061, and the first electrode plate winding entering roller set 107 being used for conveying the first electrode plate complex 125 to the winding mandrel 1061. It is only needed to make the first electrode plate complex 125 enter the winding mandrel 1061 under the driving of the first electrode plate winding entering roller set 107, and there is no need to arrange an auxiliary winding entering mechanism, which is conducive to reducing the complexity of the manufacturing device 100 and improving the production efficiency of the electrode assembly 12.

The winding mandrel 1061 comprises two or more half shafts that can be located near or away from each other. For example, the winding comprises two half shafts between which the start end of the first electrode plate complex 125 is clamped in advance, and then the winding mandrel 1061 can be rotated a predetermined number of turns. The second electrode plate 122 is then conveyed to the winding mandrel 1061 to be wound under the driving of the first electrode plate complex 125, and after the second electrode plate 122 has been wound for a predetermined length, the second electrode plate 122 is cut off using the second cut-off mechanism 110 of the manufacturing device 100, and the first electrode plate complex 125 is cut off using the first cut-off mechanism 109 of the manufacturing device 100, and the winding work is finalized. The two half shafts are opened and the electrode assembly 12 is removed from the winding mandrel 1061 to complete the unloading. In embodiments of the present application, the first electrode plate complex 125 is cut off under the clamping of the winding mandrel 1061, which can reduce the fluctuation of the first electrode plate complex 125 during the cut-off operation, especially the fluctuation of the first electrode plate complex 125 along the width direction, and is conducive to improving the degree of alignment between the first electrode plate complex 125 and the second electrode plate 122.

In some examples, the winding mechanism 106 further comprises a rotating base 1062 and at least two winding mandrels 1061, the at least two winding mandrels 1061 being disposed around an axis of rotation of the rotating base 1062 and provided at intervals on the rotating base 1062. The provision of a plurality of winding mandrels 1061 facilitates the continuous production of the electrode assembly 12. The number of winding mandrels 1061 may be two, three, four or five, etc., and embodiments of the present application do not limit the number of winding mandrels 1061.

After the first winding mandrel completes the winding work, the rotating base 1062 is rotated to rotate the first winding mandrel to the unloading station, and then one of at least two winding mandrels 1061 is rotated to the winding station, wherein this winding mandrel serves as the second winding mandrel and cuts off the first electrode plate complex 125 under the action of the first cut-off mechanism 109 after the second winding mandrel has clamped the first electrode plate complex 125. Each winding mandrel 1061 of the at least two winding mandrels 1061 can be switched between winding and unloading stations, and the at least two winding mandrels 1061 cyclically perform the winding and unloading work in sequence, so that in the process of winding a plurality of electrode assemblies 12, it is only needed to perform the winding entering work of the first electrode plate complex 125 once at a starting stage, and thereafter the at least two winding mandrels 1061 alternately clamp the first electrode plate complex 125 to perform the winding work, which can effectively improve the efficiency of the winding work.

The first cut-off mechanism of the manufacturing device generates dust or the like in the process of performing the cut-off operation, and the dust may fall to the winding station, in which case the dust is wound into the electrode assembly during the winding process, thereby making it possible that the dust pierces the first separator and/or the second separator and causes conduction and short circuit of the first electrode plate and the second electrode plate, thus leading to a potential safety hazard.

To reduce the adverse effects of dust generated by the first cut-off mechanism 109 on the electrode assembly 12, in some embodiments, the first cut-off mechanism 109 is disposed between the at least two winding mandrels 1061 and is used for cutting off the first electrode plate complex 125. The first cut-off mechanism 109 is disposed below the winding station, so that the debris produced by the first cut-off mechanism 109 substantially does not fall to the winding station, which reduces the adverse effect of dust on the interior of the electrode assembly 12, and thus can ensure the safety performance of the electrode assembly 12.

In some embodiments, the manufacturing device 100 comprises a second cut-off mechanism 110, the second cut-off mechanism 110 being disposed between the second electrode plate feeding mechanism 105 and the winding mechanism 106, and used for cutting off the second electrode plate 122. The second cut-off mechanism 110 is provided upstream of the winding mechanism 106, which is conducive to the smooth operation of the cut-off operation, and the second cut-off mechanism 110 is far from the winding mechanism 106, thereby making it possible to effectively reduce the possibility of dust produced during the cut-off process entering the winding, thus improving the safety performance of the electrode assembly 12. In some examples, the second cut-off mechanism 110 comprises a cutter and a cutter holder, and the second electrode plate 122 passes between the cutter and the cutter holder. When the second electrode plate 122 needs to be cut off, the cutter and the cutter holder are in close proximity to each other to cut off the second electrode plate 122. By way of example, the second cut-off mechanism 110 may be a laser cutter that cuts off the second electrode plate 122 by means of laser.

In some embodiments, the manufacturing device 100 further comprises a feeding guide mechanism 108, the feeding guide mechanism 108 being provided between the second electrode plate feeding mechanism 105 and the winding mechanism 106, and the feeding guide mechanism 108 being used for conveying the second electrode plate 122 to the winding mandrel 1061 so that the first electrode plate complex 125 is coated outside the second electrode plate 122. The feeding guide mechanism 108 is capable of assisting the winding entering of the second electrode plate 122, thereby improving the precision of alignment of the first electrode plate complex 125 and the second electrode plate 122, in particular the degree of alignment along the length direction of the first electrode plate complex 125. Moreover, on the basis that there is no need to provide an auxiliary feeding mechanism for the first electrode plate complex 125, the relative positions of the feeding guide mechanism 108 and the winding mechanism 106 may be closer to shorten the ending length of the second electrode plate 122, and reduce the risk of fluctuation of the second electrode plate 122, thereby improving the degree of alignment between the second electrode plate 122 and the first electrode plate complex 125, thus improving the yield of the electrode assembly 12. By way of example, the feeding guide mechanism 108 may be at a distance of ≥50 mm, or ≥45 mm, from the winding mandrel 1061 of the winding mechanism 106.

In some embodiments, the manufacturing device 100 further comprises a first detection mechanism 111, the first detection mechanism 111 being disposed between the compounding mechanism 104 and the winding mechanism 106, and the first detection mechanism 111 being used for detecting the degree of alignment for compounding of the first electrode plate 121, the first separator 123 and the second separator 124.

The first detection mechanism 111 is provided downstream of the compounding mechanism 104, and is thus capable of detecting in real time the degree of alignment of the first electrode plate 121, the first separator 123 and the second separator 124 after lamination. Only when the degree of alignment of the first electrode plate 121, the first separator 123, and the second separator 124 meets the accuracy requirements can the first electrode plate complex 125 be conveyed to the winding mechanism 106 for winding, which is conducive to ensuring the yield and quality of the wound electrode assembly 12. Of course, the first detection mechanism 111 can also detect surface defects of the first electrode plate complex 125, such as whether there are impurities or breakage on the surface of the first electrode plate complex 125, and when the surface of the first electrode plate complex 125 meets the requirements, it can be conveyed to the winding mechanism 106 for winding, which is conducive to further guaranteeing the yield and quality of the electrode assembly 12 after winding. As some examples, the first detection mechanism 111 comprises an industrial camera or photoelectric sensor for detecting the degree of alignment.

In some embodiments, the manufacturing device 100 further comprises a first deviation rectification mechanism 112 and a second deviation rectification mechanism 113. The first deviation rectification mechanism 112 is disposed between the compounding mechanism 104 and the winding mechanism 106, and the first deviation rectification mechanism 112 is used for adjusting the relative positions of the first electrode plate complex 125 and the second electrode plate 122, so as to adjust the degree of alignment between the first electrode plate complex 125 and the second electrode plate 122. The first deviation rectification mechanism 112 adjusts the relative positions between the first electrode plate complex 125 and the second electrode plate 122 along the width direction of the first electrode plate complex 125, so that the first electrode plate complex 125 and the second electrode plate 122 are aligned with each other, and the degree of alignment between the two meets the product requirements, which is conducive to improving the yield of the electrode assembly 12. The second deviation rectification mechanism 113 is disposed between the second electrode plate feeding mechanism 105 and the winding mechanism 106, and the second deviation rectification mechanism 113 is used for adjusting the relative positions of the first electrode plate complex 125 and the second electrode plate 122. The second deviation rectification mechanism 113 adjusts the relative positions between the first electrode plate complex 125 and the second electrode plate 122 along the width direction of the second electrode plate 122, so that the first electrode plate complex 125 and the second electrode plate 122 are aligned with each other, and the degree of alignment between the two meets the product requirements, which is conducive to improving the yield of the electrode assembly 12.

Optionally, the manufacturing device 100 further comprises a second detection mechanism, wherein the second detection mechanism is separately in communicative connection with the first deviation rectification mechanism 112 and the second deviation rectification mechanism 113. The second detection mechanism, upon detecting that the degree of alignment between the first electrode plate complex 125 and the second electrode plate 122 does not meet the requirements, sends a signal to the first deviation rectification mechanism 112 and/or the second deviation rectification mechanism 113, and then the first deviation rectification mechanism 112 and/or the second deviation rectification mechanism 113 performs a deviation rectification operation to adjust the degree of alignment between the first electrode plate complex 125 and the second electrode plate 122.

In some embodiments, the manufacturing device 100 further comprises a third deviation rectification mechanism 114, a fourth deviation rectification mechanism 115, and a fifth deviation rectification mechanism 116. The third deviation rectification mechanism 114 is disposed between the first electrode plate feeding mechanism 101 and the compounding mechanism 104, and the third deviation rectification mechanism 114 is used for adjusting the relative positions between the first electrode plate 121, the first separator 123, and the second separator 124. The fourth deviation rectification mechanism 115 is disposed between the first separator feeding mechanism 102 and the compounding mechanism 104, and the fourth deviation rectification mechanism 115 is used for adjusting the relative positions between the first electrode plate 121, the first separator 123, and the second separator 124. The fifth deviation rectification mechanism 116 is disposed between the second separator feeding mechanism 103 and the compounding mechanism 104, and the fifth deviation rectification mechanism 116 is used for adjusting the relative positions between the first electrode plate 121 and the first separator 123 and the second separator 124. The third deviation rectification mechanism 114 adjusts the relative positions between the first electrode plate 121, the first separator 123, and the second separator 124 along the width direction of the first electrode plate 121 so that the three are aligned with each other. The fourth deviation rectification mechanism 115 adjusts the relative positions between the first electrode plate 121, the first separator 123, and the second separator 124 along the width direction of the first separator 123 so that the three are aligned with each other. The fifth deviation rectification mechanism 116 adjusts the relative positions between the first electrode plate 121, the first separator 123, and the second separator 124 along the width direction of the second separator 124 so that the three are aligned with each other.

Optionally, the manufacturing device 100 further comprises a third detection mechanism, wherein the third detection mechanism is separately in communicative connection with the third deviation rectification mechanism 114, the fourth deviation rectification mechanism 115, and the fifth deviation rectification mechanism 116. The third detection mechanism, upon detecting that the degree of alignment between the first electrode plate 121, the first separator 123, and the second separator 124 does not meet the requirements, sends a signal to at least one of the third deviation rectification mechanism 114, the fourth deviation rectification mechanism 115, and the fifth deviation rectification mechanism 116, and then the at least one of the third deviation rectification mechanism 114, the fourth deviation rectification mechanism 115, and the fifth deviation rectification mechanism 116 performs a deviation rectification operation to adjust the degree of alignment between the first electrode plate 121, the first separator 123, and the second separator 124.

In some embodiments, the manufacturing device 100 further comprises a first tensioning mechanism 117, a second tensioning mechanism 118, and a third tensioning mechanism 119. The first tensioning mechanism 117 is provided between the compounding mechanism 104 and the winding mechanism 106, and the first tensioning mechanism 117 is used for adjusting the degree of tensioning of the first electrode plate complex 125, so as to reduce the risk of wrinkling of the first electrode plate complex 125, thereby improving the yield of the electrode assembly 12. The second tensioning mechanism 118 is provided between the second electrode plate feeding mechanism 105 and the winding mechanism 106, and the second tensioning mechanism 118 is used for adjusting the degree of tensioning of the second electrode plate 122, so as to reduce the risk of wrinkling of the second electrode plate 122, thereby improving the yield of the electrode assembly 12. The third tensioning mechanism 119 is provided between the first electrode plate feeding mechanism 101 and the compounding mechanism 104, and the third tensioning mechanism 119 is used for adjusting the degree of tensioning of the first electrode plate 121, so as to reduce the risk of wrinkling of the first electrode plate 121, thereby improving the yield of the electrode assembly 12.

In some embodiments, the quantity of the first electrode plate feeding mechanisms 101 is two, and the manufacturing device 100 further comprises a first roll changing mechanism 120 provided between the first electrode plate feeding mechanism 101 and the compounding mechanism 104, two first electrode plate feeding mechanisms 101 being provided on two sides of the first roll changing mechanism 120, respectively. The two first electrode plate feeding mechanisms 101 may have one spare and one in use, which means that after the material roll of one of the first electrode plate feeding mechanisms 101 is used up, the material roll is changed in a timely manner by the first roll changing mechanism 120, which is conducive to improving the production efficiency.

In some embodiments, the quantity of the second electrode plate feeding mechanisms 105 is two, and the manufacturing device 100 further comprises a second roll changing mechanism 130 provided between the second electrode plate feeding mechanism 105 and the winding mechanism 106, two second electrode plate feeding mechanisms 105 being provided on two sides of the second roll changing mechanism 130, respectively. The two second electrode plate feeding mechanisms 105 may have one spare and one in use, which means that after the material roll of one of the second electrode plate feeding mechanisms 105 is used up, the material roll is changed in a timely manner by the second roll changing mechanism 130, which is conducive to improving the production efficiency.

In some embodiments, the manufacturing device 100 further comprises a separator flattening mechanism 140 and a back gum adhesive mechanism 150, the separator flattening mechanism 140 being used for compressing the electrode assembly 12 so that the electrode assembly 12 does not unwind. The back gum adhesive mechanism 150 is used for bonding the electrode assembly 12 to shape the electrode assembly 12.

In some embodiments, the manufacturing device 100 further comprises a pre-pressing mechanism 160, the pre-pressing mechanism 160 being used for flattening the electrode assembly 12 into a flat-like structure. The electrode assembly 12 may be first wound into a hollow cylindrical structure and then flattened into a flat shape by the pre-pressing mechanism 160 after winding. The electrode assembly 12 after completion of the pre-pressing is conveyed to a subsequent process via a transport assembly 170 such as a transport belt.

Embodiments of the present application further provide a manufacturing method for an electrode assembly, which can be performed using the manufacturing device of the above embodiments.

Figure 4:
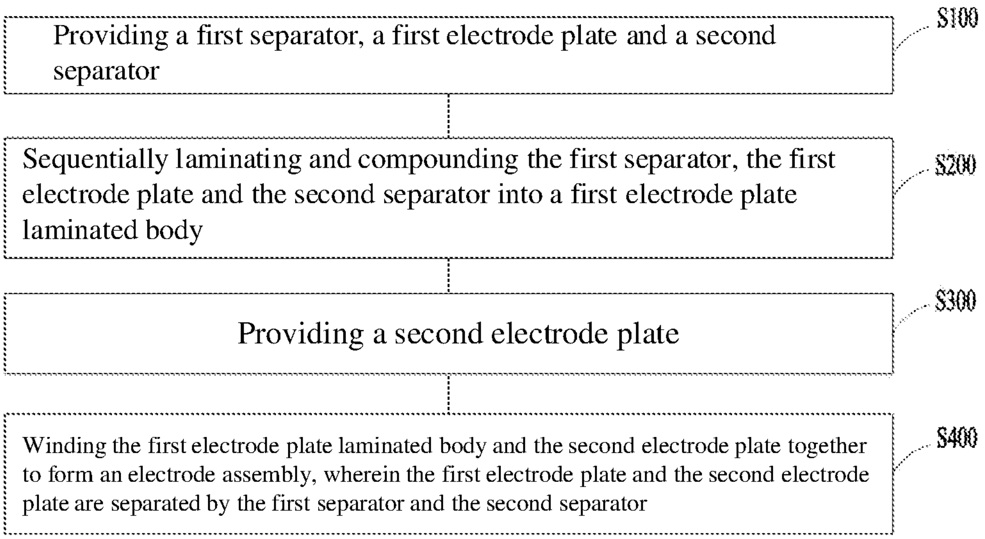
FIG. 4 is a flowchart of a manufacturing method for an electrode assembly provided in some embodiments of the present application.

FIG. 4 is a flowchart of a manufacturing method for an electrode assembly provided in some embodiments of the present application.

As shown in FIG. 4, the method comprises the following steps:

- S100, providing a first separator, a first electrode plate and a second separator;
- S200, sequentially laminating and compounding the first separator, the first electrode plate and the second separator into a first electrode plate complex;
- S300, providing a second electrode plate; and
- S400, winding the first electrode plate complex and the second electrode plate together to form an electrode assembly, wherein the first electrode plate and the second electrode plate are separated by the first separator and the second separator.

In embodiments of the present application, in a first aspect, the first separator, the first electrode plate, and the second separator are compounded into an integral body in advance, and thus the first aspect is capable of reducing the risk of warping, folding, or wrinkling of the first electrode plate, thereby improving the yield of the electrode assembly. In a second aspect, since the first electrode plate, the first separator and the second separator are pre-aligned and compounded as an integral body, conveying the first electrode plate complex and the second electrode plate to the winding mechanism for winding effectively reduces the total number of plates entering the winding mechanism, which is conducive to reducing the difficulty of aligning the first electrode plate, the first separator, the second separator and the second electrode plate and is particularly conducive to increasing the precision of alignment of the first electrode plate and the second electrode plate, thereby further improving the yield of the electrode assembly. In a third aspect, the first electrode plate enters the winding mechanism under the driving of the first separator and the second separator, so that it is possible to not arrange a winding entering auxiliary mechanism for guiding winding entering of the first electrode plate, thereby simplifying the structure of the device, while at the same time facilitating the improvement of the production efficiency of the winding.

Figure 5:
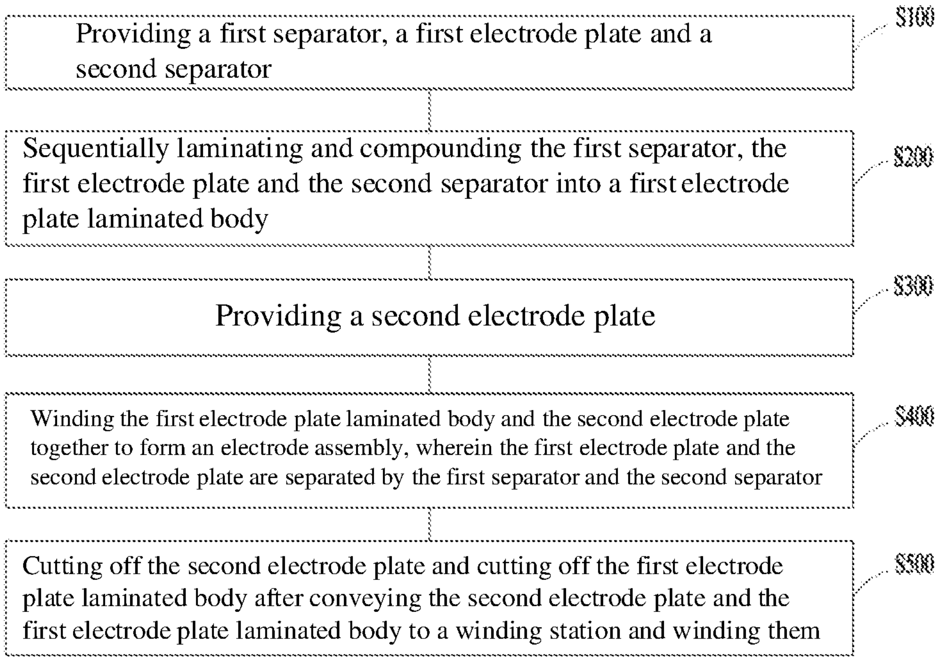
FIG. 5 is a flowchart of a manufacturing method for an electrode assembly provided in some other embodiments of the present application.

FIG. 5 is a flowchart of a manufacturing method for an electrode assembly provided in some other embodiments of the present application.

As shown in FIG. 5, in some embodiments, the method further comprises:

- S500, cutting off the second electrode plate and cutting off the first electrode plate complex after conveying the second electrode plate and the first electrode plate complex to a winding station and winding them.

The dust produced by the cut-off operation for the first electrode plate complex substantially does not affect the winding entering operation, thus enabling the improvement of the safety performance of the electrode assembly.

Although the present application has been described with reference to some embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A manufacturing device for an electrode assembly, comprising:

a first electrode plate feeding mechanism configured to convey a first electrode plate;

a first separator feeding mechanism configured to convey a first separator;

a second separator feeding mechanism configured to convey a second separator;

a compounding mechanism provided downstream of the first electrode plate feeding mechanism, the first separator feeding mechanism, and the second separator feeding mechanism, the compounding mechanism being configured to sequentially laminate and compound the first separator, the first electrode plate, and the second separator into a first electrode plate complex, the sequentially laminating and compounding comprising compounding and connecting the first separator to a first side of the first electrode plate and the second separator to a second side of the first electrode plate to form, in advance of winding, the first electrode plate complex, the first electrode plate complex comprising an integral structure in which the first electrode plate is covered on the first side by the first separator and on the second side by the second separator, the compounding mechanism comprising at least one of a hot pressing device, an electrostatic generator, a gluing device, or a plasma adsorption device;

a second electrode plate feeding mechanism configured to convey a second electrode plate, the second electrode plate and the first electrode plate having opposite polarities; and a winding mechanism provided downstream of the compounding mechanism and the second electrode plate feeding mechanism and configured to wind the first electrode plate complex and the second electrode plate to form an electrode assembly, the winding mechanism comprising a winding mandrel configured to clamp a start end of the first electrode plate complex, the winding mechanism being configured to wind the first electrode plate complex on the winding mandrel for a predetermined number of turns and to thereafter receive the second electrode plate conveyed to the winding mandrel to be wound under a driving of the first electrode plate complex.

2. The manufacturing device according to claim 1, wherein:

the winding mechanism further comprises a first electrode plate winding entering roller set, the first electrode plate winding entering roller set being provided upstream of the winding mandrel, and the first electrode plate winding entering roller set being configured to convey the first electrode plate complex to the winding mandrel.

3. The manufacturing device according to claim 2, further comprising:

a feeding guide mechanism, the feeding guide mechanism being provided between the second electrode plate feeding mechanism and the winding mechanism, and the feeding guide mechanism being configured to convey the second electrode plate to the winding mandrel so that the first electrode plate complex is coated outside the second electrode plate.

4. The manufacturing device according to claim 2, wherein:

the winding mechanism further comprises a rotating base and at least two winding mandrels, the at least two winding mandrels being provided around an axis of rotation of the rotating base and provided at intervals on the rotating base.

5. The manufacturing device according to claim 4, further comprising:

a first cut-off mechanism, the first cut-off mechanism being disposed between the at least two winding mandrels and configured to cut off the first electrode plate complex; and/or a second cut-off mechanism, the second cut-off mechanism being disposed between the second electrode plate feeding mechanism and the winding mechanism and configured to cut off the second electrode plate.

6. The manufacturing device according to claim 1, further comprising:

a first detection mechanism, the first detection mechanism being disposed between the compounding mechanism and the winding mechanism, and the first detection mechanism being configured to detect a degree of alignment for compounding of the first electrode plate, the first separator and the second separator.

7. The manufacturing device according to claim 1, further comprising:

a first deviation rectification roller set and a second deviation rectification roller set;

wherein:

the first deviation rectification roller set is disposed between the compounding mechanism and the winding mechanism, and the first deviation rectification roller set is configured to adjust relative positions of the first electrode plate complex and the second electrode plate; and the second deviation rectification roller set is disposed between the second electrode plate feeding mechanism and the winding mechanism, and the second deviation rectification roller set is configured to adjust relative positions of the first electrode plate complex and the second electrode plate.

8. The manufacturing device according to claim 1, further comprising:

a third deviation rectification roller set, a fourth deviation rectification roller set and a fifth deviation rectification roller set;

wherein:

the third deviation rectification roller set is disposed between the first electrode plate feeding mechanism and the compounding mechanism, and the third deviation rectification roller set is configured to adjust relative positions between the first electrode plate, the first separator, and the second separator;

the fourth deviation rectification roller set is disposed between the first separator feeding mechanism and the compounding mechanism, and the fourth deviation rectification roller set is configured to adjust relative positions between the first electrode plate, the first separator, and the second separator; and the fifth deviation rectification roller set is disposed between the second separator feeding mechanism and the compounding mechanism, and the fifth deviation rectification roller set is configured to adjust relative positions between the first electrode plate and the first separator and the second separator.

9. The manufacturing device according to claim 1, further comprising:

a first tensioning mechanism, a second tensioning mechanism and a third tensioning mechanism;

wherein:

the first tensioning mechanism is provided between the compounding mechanism and the winding mechanism, and the first tensioning mechanism is configured to adjust a degree of tensioning of the first electrode plate complex;

the second tensioning mechanism is provided between the second electrode plate feeding mechanism and the winding mechanism, and the second tensioning mechanism is configured to adjust a degree of tensioning of the second electrode plate; and the third tensioning mechanism is provided between the first electrode plate feeding mechanism and the compounding mechanism, and the third tensioning mechanism is configured to adjust a degree of tensioning of the first electrode plate.

10. A manufacturing method for an electrode assembly, comprising:

providing a first separator, a first electrode plate and a second separator;

sequentially laminating and compounding the first separator, the first electrode plate and the second separator into a first electrode plate complex, the sequentially laminating and compounding comprising compounding and connecting the first separator to a first side of the first electrode plate and the second separator to a second side of the first electrode plate to form, in advance of winding, the first electrode plate complex, the first electrode plate complex comprising an integral structure in which the first electrode plate is covered on the first side by the first separator and on the second side by the second separator;

providing a second electrode plate; and winding the first electrode plate complex and the second electrode plate together to form an electrode assembly, wherein the first electrode plate and the second electrode plate are separated by the first separator and the second separator, the winding the first electrode plate complex and the second electrode plate together comprising winding the first electrode plate complex on a winding mandrel for a predetermined number of turns and thereafter receiving the second electrode plate conveyed to the winding mandrel to be wound under a driving of the first electrode plate complex.

11. The manufacturing method according to claim 10, further comprising:

cutting off the second electrode plate and cutting off the first electrode plate complex after conveying the second electrode plate and the first electrode plate complex to a winding station and winding the second electrode plate and the first electrode plate complex.

* * * * *